(12) United States Patent
Ollis et al.

(10) Patent No.: US 6,728,608 B2
(45) Date of Patent: Apr. 27, 2004

(54) SYSTEM AND METHOD FOR THE CREATION OF A TERRAIN DENSITY MODEL

(75) Inventors: Mark Ollis, Pittsburgh, PA (US); Todd Jochem, Gibsonia, PA (US)

(73) Assignee: Applied Perception, Inc., Wexford, PA (US)

(*) Notice: Subject to any disclaimer, the term of this patent is extended or adjusted under 35 U.S.C. 154(b) by 0 days.

(21) Appl. No.: 10/226,933

(22) Filed: Aug. 23, 2002

(65) Prior Publication Data

US 2004/0039498 A1 Feb. 26, 2004

(51) Int. Cl.[7] ............... G01C 21/00; G05D 1/00
(52) U.S. Cl. ............... 701/28; 701/223; 342/70; 180/169
(58) Field of Search ............... 701/23, 25, 28, 701/208, 223; 342/70; 702/5; 348/118, 119; 318/587; 180/167, 168, 169

(56) References Cited

U.S. PATENT DOCUMENTS

| | | | |
|---|---|---|---|
| 4,751,658 A | | 6/1988 | Kadonoff et al. |
| 5,525,882 A | | 6/1996 | Asaka et al. |
| 5,684,695 A | | 11/1997 | Bauer |
| 5,771,310 A | | 6/1998 | Vannah |
| 5,819,016 A | | 10/1998 | Watanabe et al. |
| 5,943,476 A | | 8/1999 | Dougherty et al. |
| 5,988,862 A | | 11/1999 | Kacyra et al. |
| 6,009,359 A | | 12/1999 | El-Hakim et al. |
| 6,018,497 A | * | 1/2000 | Gunasekera ............... 367/72 |
| 6,124,694 A | | 9/2000 | Bancroft et al. |
| 6,195,922 B1 | * | 3/2001 | Stump ............... 37/348 |
| 6,205,380 B1 | * | 3/2001 | Bauer et al. ............... 701/23 |
| 6,345,235 B1 | | 2/2002 | Edgecombe et al. |
| 6,373,612 B1 | | 4/2002 | Hoffman et al. |
| 6,396,492 B1 | | 5/2002 | Frisken et al. |
| 6,420,698 B1 | | 7/2002 | Dimsdale |
| 6,470,271 B2 | * | 10/2002 | Matsunaga ............... 701/301 |

OTHER PUBLICATIONS

Fregene et al.; Incremental Multiagent Robotic Mapping of Outdoor Terrains; IEEE–Intl. Conf. on Robotics & Automation; May 2002; pp. 1339–1346.*

Najjaran et al.; Map Building for a Terrain Scanning Robot; IEEE–Intl. Conf. on Robotics & Automation ; May 2001; pp. 3728–3733.*

Kweon et al.; High Resolution Terrain Map from Multiple Sensor Data; IEEE–Intelligent Robots and Systems '90; Jul. 1990; vol. 1, pp. 127–134.*

Shen et al.; Autonomous Navigation to Provide Long–distance Surface Traverses for Mars Rover Sample Return Mission; IEEE–Intelligent Control, 1989; Sep. 1989; pp. 362–367.*

\* cited by examiner

Primary Examiner—Michael J. Zanelli
(74) Attorney, Agent, or Firm—Buchanan Ingersoll; Dennis M. Carleton (57) ABSTRACT

A system and method of constructing a density map is disclosed. The density map is a cellular grid representing local terrain, wherein each cell contains a density vector representing the density of portion of the terrain corresponding to the cell. The density map can be used to classify and characterize the surrounding terrain, which is useful in making a determination of the traversability of the terrain to mobile vehicles.

23 Claims, 8 Drawing Sheets

SYSTEM AND METHOD FOR THE CREATION OF A TERRAIN DENSITY MODEL

FIELD OF THE INVENTION

This invention is related to the field of robotics, and, in particular to the autonomous navigation of mobile robots over terrain with unknown characteristics, including elevation and obstacles.

BACKGROUND OF THE INVENTION

The problem of allowing a mobile robotic device to autonomously and successfully navigate through an area defined by unknown terrain, based on the output of on-board sensors to sense characteristics of the terrain in the field of navigation is relatively well known. Several attempts have been made, using various strategies, to allow autonomous navigation. For example, U.S. Pat. No. 4,751,658 (Kadonoff, et al.) discloses a system wherein a robot's field of view is divided into sectors and a plurality of sensors is used to detect the distance of objects within each sector. U.S. Pat. No. 5,525,882 (Asaka, et al.) discloses a method wherein data from a sensor is combined with image data to identify objects in the robot's path. The data is compared to a table containing profiles of known objects. U.S. Pat. No. 5,684,695 (Bauer) discloses the use of a cellular map which contains information regarding the "occupancy degree" of each cell in the map. Finally, U.S. Pat. No. 6,124,694 (Bancroft, et al.) outlines a method whereby a cleaning robot establishes the boundaries of the area to be cleaned using sonar and a laser range finder.

These inventions of these patents are effective in providing obstacle detection and avoidance in open terrain and with discrete objects that must be detected and avoided.

However, no known method is currently effective in environments that are more complex and wherein obvious obstacle-free paths for the robot to traverse are not available. An outdoors, off-road environment is an example of a complex environment in which the known methods would not work effectively.

The reason for the difficulty in navigating complex environments is the inherent ambiguity in the types of obstacles which may be encountered. For example, a thick stand of meadow grass, while traversable by a robot, may appear to be an obstacle when detected using the present technology. On the other hand, a chain link fence may appear clear and therefore give the erroneous impressions that the robot could traverse a path through the fence.

While it is true that existing obstacle detection algorithms could be made to work for specific cases, it would be desirable to have a more generalized approach that could make decisions independent of specific types of obstacles.

SUMMARY OF THE INVENTION

For robust autonomous off-road vehicle operation, it is necessary to provide, in addition to object detection, terrain classification. To this end, the invention disclosed herein provides a method whereby a density map, which provides measurements of the physical density of various locations, is created. The density map representation of the world provides a continuous measure of terrain traversability, as well as serving as a powerful structural discriminator for the terrain classification task.

To establish the density map, a plurality of sensors of various types are employed and an approach based on penetrability is used. Penetrability is defined as the degree to which a sensor reading passes through or stops in a particular geometric area. After penetrability measures have been computed for each sensor, our method combines them into a single density reading for each location in the density map, using sensor-specific rules.

The density map, once computed, can be used to provide terrain classification, which is a more generalized form of obstacle detection. However, whereas in obstacle detection the goal is to assess only the traversability of a particular location, the terrain classification task seeks to also determine other more specific physical properties, like vegetation (bush or tree trunk) or ground (dry dirt or mud) type. Therefore, the density map provides novel features when compared to existing techniques for this terrain classification. The density map provides an orthogonal, structural measure of terrain type that can be used to better classify objects in the environment. Furthermore, because density is a physical characteristic, it can be more easily interpreted and used by planning and navigation modules to control robot actions. Finally, because density is invariant to lighting conditions and temperature it is possible to provide reliable terrain classification information across a wider range of operating conditions.

DETAILED DESCRIPTION OF THE INVENTION

A density map is a grid of cells representing the terrain surrounding the robot, vehicle or platform upon which the sensors are mounted. Each cell in the map characterizes a portion of the terrain. The map cells can be of any size, however, in the preferred embodiment, cells with 20 centimeter resolutions have been found to represent terrain reasonably well without placing an undue burden on computing resources. The map is stored in a storage medium connected to a computer which can be either on-board the vehicle or located remotely.

The data stored in each cell consists of at least two components, and, optionally, a third component. One component is the minimum elevation of the terrain in the cell, as measured by one or more of the sensors. The other component is a "density vector" which represents the "density" of the cell above the minimum elevation as it appears to each sensor. The optional component is the maximum elevation of the cell, with the maximum elevation being defined as the highest point of any object located above the ground in the cell.

Figure 1:
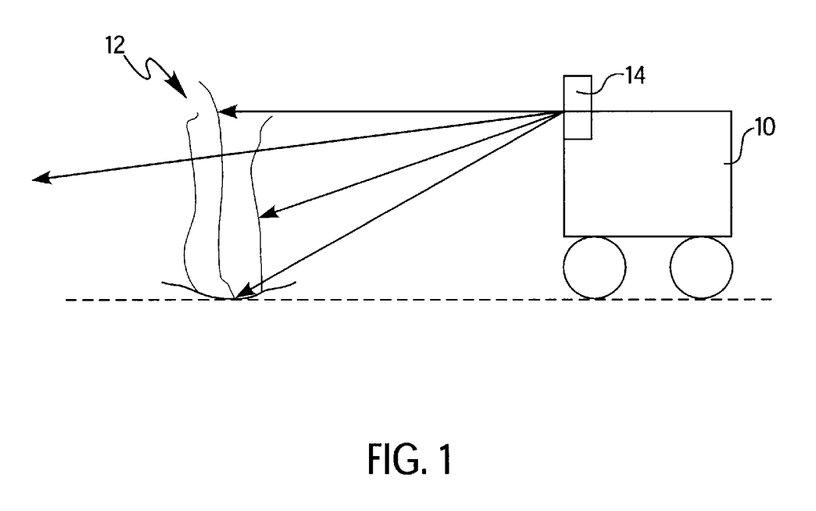
FIG. 1 shows an autonomous mobile vehicle having a dual access laser range finder mounted thereon, which scans both vertical and horizontally.
Figure 2:
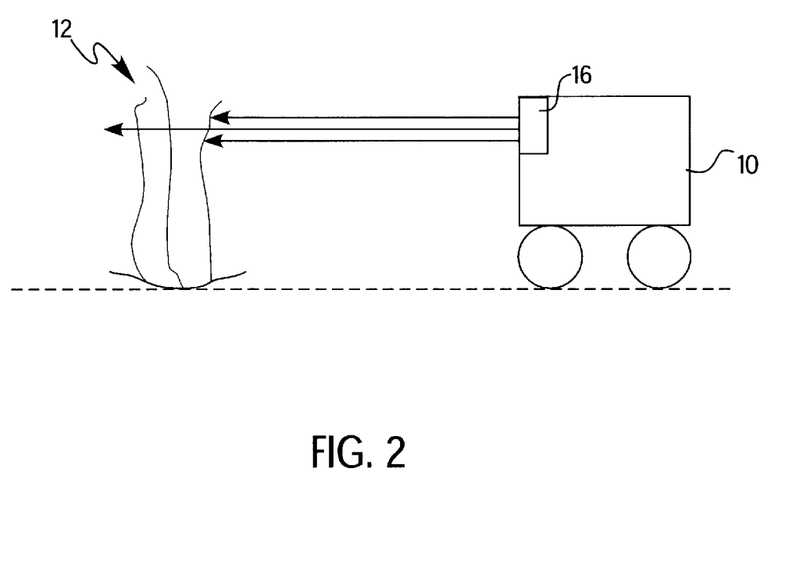
FIG. 2 shows an autonomous mobile vehicle having a single access laser range finder mounted thereon, which scans in a plane parallel to the ground.
Figure 3:
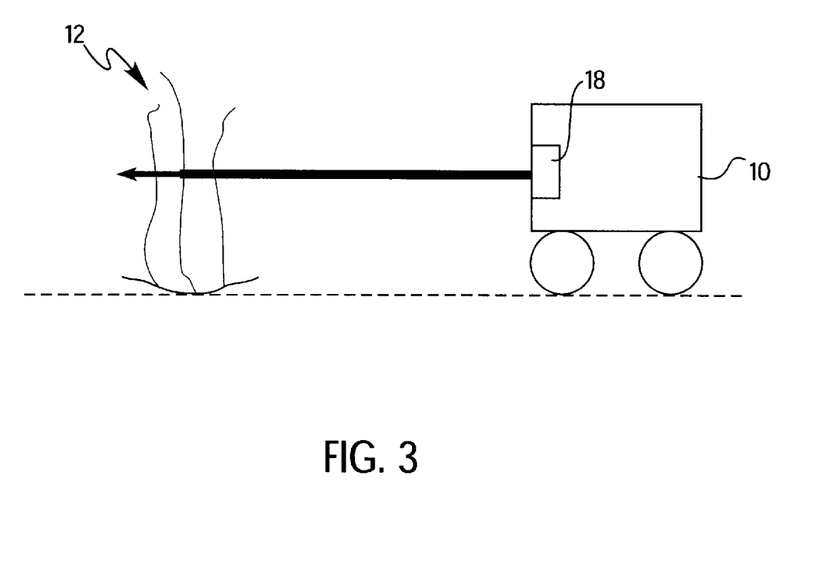
FIG. 3 shows a mobile autonomous vehicle having a radar mounted thereon.

As an example, refer to FIGS. 1–3, showing an example density map grid cell, as seen by three different sensors mounted on autonomous mobile vehicle 10. In this example, measurements are taken from vehicle 10 and the grid cell being measured contains some sparse tall grass 12.

In FIG. 1, sensor 14 may be a two axis laser range scanner, capable of scanning both horizontally and vertically, such as the model LMS-Z210 scanner manufactured by Riegl (Germany), which would be useful in obtaining the minimum elevation measurement for each cell. FIG. 2 shows one or more sensors 16, which may be a single axis laser range scanner, such as model LMS-200 manufactured by Sick (Germany). Because the single axis scanner is capable of scanning only in a horizontal plane, the sensor must be mounted at a height on vehicle 10 which is likely to be of the most interest to the algorithms being used to establish traversability of a particular cell. Alternatively, one or more of these sensors could be mounted at varying heights on vehicle 10. The particular sensors mentioned take separate data measurements every half degree within a 180 degree field of view. The laser beam begins with a finite width of 2 centimeters and grows slightly with distance, but for the level of accuracy necessary for the purpose of establishing a density map, the width and divergence of the beam can be ignored and the beam can be modeled as a single infinitely thin ray. The beam propagation is modeled very simply—each ray begins at the sensor origin, traverses through a number of cells, and then terminates in a single cell.

Figure 4:
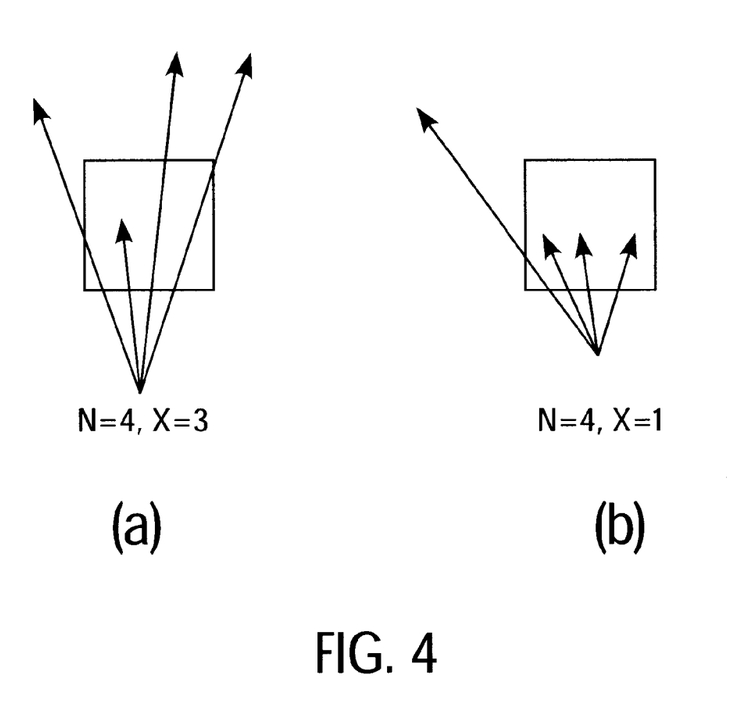
FIG. 4 shows two cells in a density map according to the present invention, showing the calculation for density from a particular sensor mounted on the mobile autonomous vehicle.

Each grid cell in the field of view of sensor 16 is then considered. By counting all of the rays that enter the cell (N), and all of the rays that exit the cell (X), we can calculate the density for the particular cell as seen by this particular sensor. FIG. 4 shows this calculation for two cells. For all the cells for which N is greater than some minimum, we can compute the ratio X/N as an estimate of the density. In the above example, the left map cell will have a density of 0.25 while the cell on the right has a density of 0.75. It is determined that a beam did not exit a particular cell when a return is detected from that beam at a range consistent with the location of the particular cell.

Figure 5:
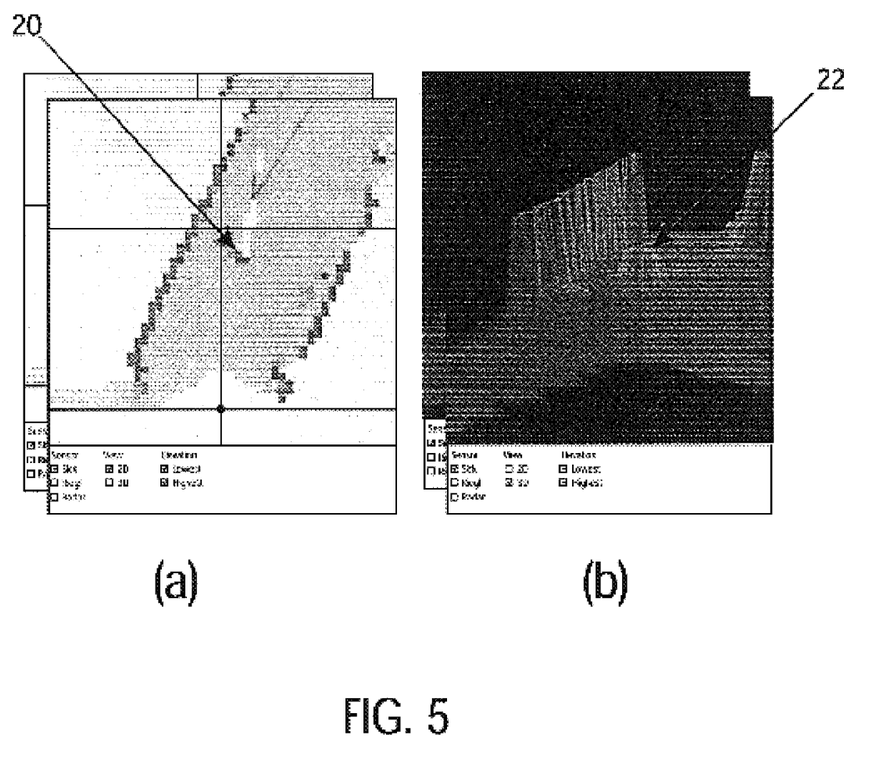
FIG. 5a shows a graphical representation of a density map showing a single obstacle.
FIG. 5b is a three dimensional projection of the map of FIG. 5a onto a set of elevation data for the terrain surrounding the vehicle.

FIGS. 5a and 5b shows graphical representations of two simple density maps generated using the density estimation algorithm described above. For the density maps of FIG. 5, vehicle 10 is located in a long, narrow bay having an obstacle 20 located in the field of view of the sensors. The shading of the map varies from light, indicating a low density to dark, indicating higher densities. The graphics in FIG. 5a is a representation of the density map by itself. Note shadow 22 cast by obstacle 20. FIG. 5b is a 3D projection of the map of FIG. 5a onto elevation data from the two axis laser range scanner 14.

FIG. 3 shows vehicle 10 outfitted with a radar sensor 18, such as the 24 Ghz unit manufactured by Visteon. This particular sensor emits 7 beams that are centered at approximately 20-degree intervals. In addition, each beam has a divergence of approximately 30 degrees. Although radar of any wavelength may be used, it is important to note that radars having differing wavelengths will produce different returns from different terrain types. That is, some obstacles may be transparent to a radar with a 2.4 GHz wavelength, but produce a strong return when a 24 GHHz radar is used. Therefore, it is possible to use multiple radar units of different wavelengths to improve the effectiveness of the density map.

The radar is mounted so that the ray at the center of each beam is parallel to the ground. The sensor phenomenology and geometric characteristics of the radar are quite different from the laser range scanner, and the approach to calculating density described above with respect to the one and two axis laser range scanners is therefore not suitable for use with radar.

Figure 6:
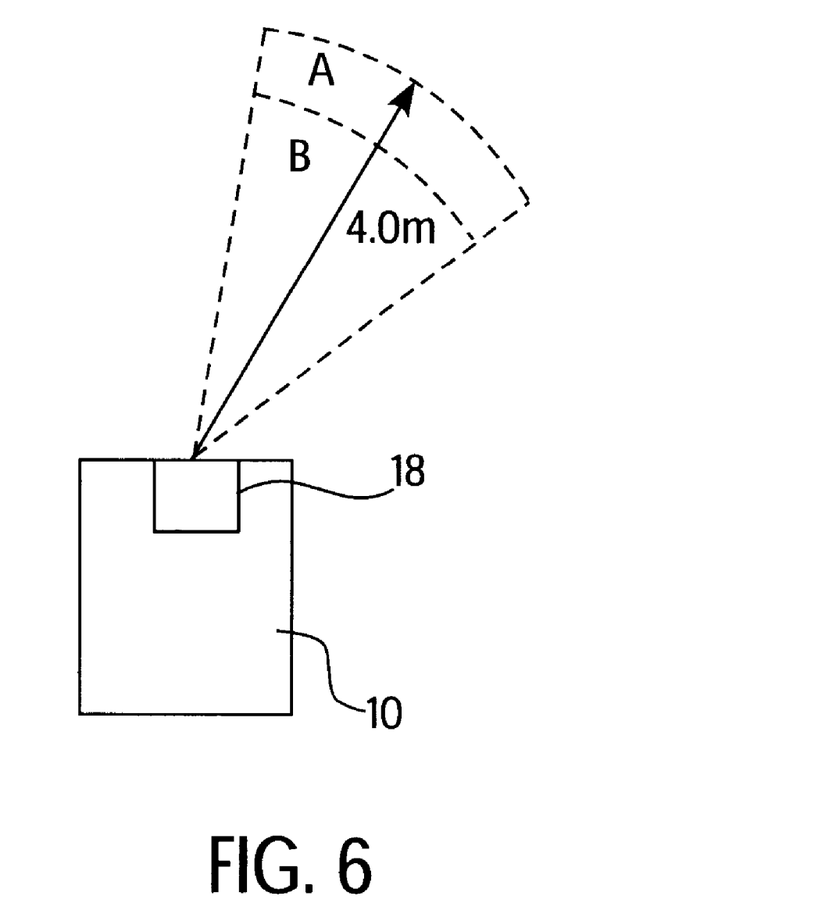
FIG. 6 is a schematic of an autonomous mobile vehicle showing the problem of angular spread of a radar beam.

The primary challenge in incorporating radar information into the density map is the wide angular spread of the beam. Because of the spread, it can be difficult to ascertain which cells need to be updated given a particular reading from the radar. Using a very simple model of the beam distribution, a reading of 4.0 meters from a radar sensor could result from an obstacle positioned anywhere within the area labeled A in FIG. 6. Using a grid cell size of 20 cm, this area may cover many grid cells. While we could mark all of area A as highly dense to radar, this operation will likely result in many mislabeled cells.

Fortunately not all cell updates are so ambiguous. We can, for example, mark all the grid cells in area B in FIG. 6 with very low density values, and have a high confidence that this labeling is correct. The reason is that the reading of 4.0 meters is inconsistent with any radar return from any of the cells in area B.

Figure 7:
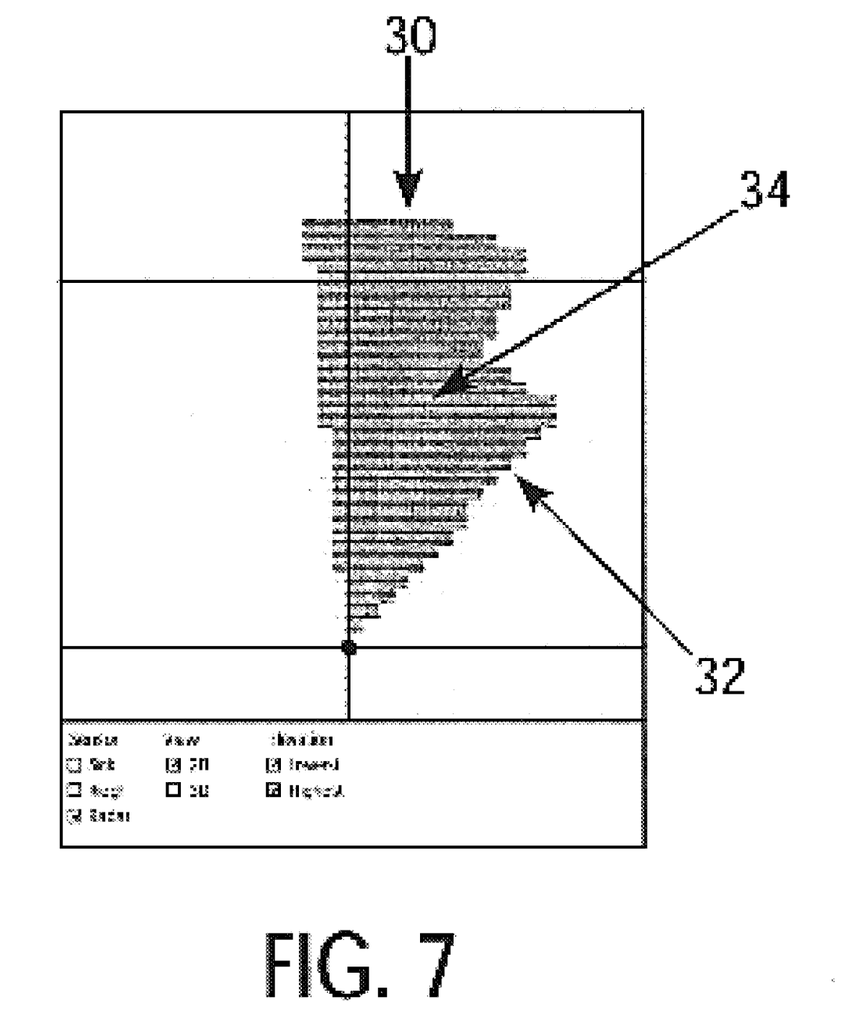
FIG. 7 shows a density map built from two individual radar readings.

The radar model is therefore very simple. The difficult task of labeling of cells which appear highly dense to radar is neglected in favor of the unambiguous task of labeling highly permeable cells. For example, the image in FIG. 7 shows a density map built from two individual radar readings. No highly dense areas have been detected.

Everything within the radar cones 30 and 32 is considered permeable. Furthermore, the area of overlap, 34, has an even lower density, since two different beams have failed to find a target in that area.

Using this updating scheme, the radar will not by itself be able to locate obstacles. However, radar data of this form is extremely useful when combined with density data from the laser range scanners as an interpretive tool. For example, a chain link fence may not be detected by laser scanners, or may be detected as having a very low density based on the method previously described. However, the same fence will produce a strong return from the radar scanner.

Note that different types of sensors other than those discussed may also be used, in various combinations. For example, sonar and infrared sensors and imaging data may also be used. Because different sensors will have varying physical and sensing characteristics, sensor-specific rules must be defined for each new type of sensor. The invention is therefore not meant to be limited to the particular sensors, types of sensors, or combinations of sensors discussed, but is meant to include all types of environmental sensors, currently known or yet to be developed.

To map the data collected from the sensors into a density map, different scan rates and vehicle motion must be taken into account. Each of the sensors discussed as examples runs at its own pace: the single axis laser range scanners each perform 6 full scans per second, the two-axis laser range scanner finishes a full scan of 80 lines every three seconds and the radar unit returns nine pulses per second. These various sources of data must be normalized to account for their asynchronicity and motion of the vehicle.

Construction of density maps requires that multiple readings be taken from each sensor. However, this accumulation of data can occur over a relatively brief period of time. In the preferred embodiment. It has been determined that a period of two seconds or less is sufficient for the sensors we are using, however, the actual time period is a function of vehicle speed. Our test vehicle, over a period of two seconds, is capable of moving far enough such that the difference in vehicle pose for each sensor reading must be taken into account. However, the time interval is small enough that these vehicle pose estimates need only minimal accuracy. For example, if the vehicle is moving at one meter per second and error accumulates at a rate of 5 centimeters per meter traveled, the total accumulated error over a two second interval will be only 10 centimeters, which is smaller than the typical 20 cm resolution of our density maps.

Our normalization strategy is therefore relatively straightforward. A multithreaded software application polls the vehicle controller at a rate of 20 Hz. As each sensor observation is taken, it is tagged with time and estimated vehicle position. However, exactly what constitutes a sensor observation is different for each sensor. For example, using our above-described exemplary sensors, a single sensor observation can be any of the following:

a single set of readings from each of the radars in the radar array;

a 180 degree complete scan from one of the single-axis laser range scanners; or a single line from the two-axis laser range scanner.

These sensor readings are stored in memory until they can be processed into a density map. At that point, they are added to the map according to the algorithm shown in FIG. 8. The notation for the algorithm is as follows: D is the density map, Coord(D) is the coordinate system of the density map, S is a sensor reading, Cv(S) is the pose of the vehicle at the time S was taken, and Cs(S) is the coordinate transform from the sensor coordinate system into the vehicle coordinate system.

Figure 8:
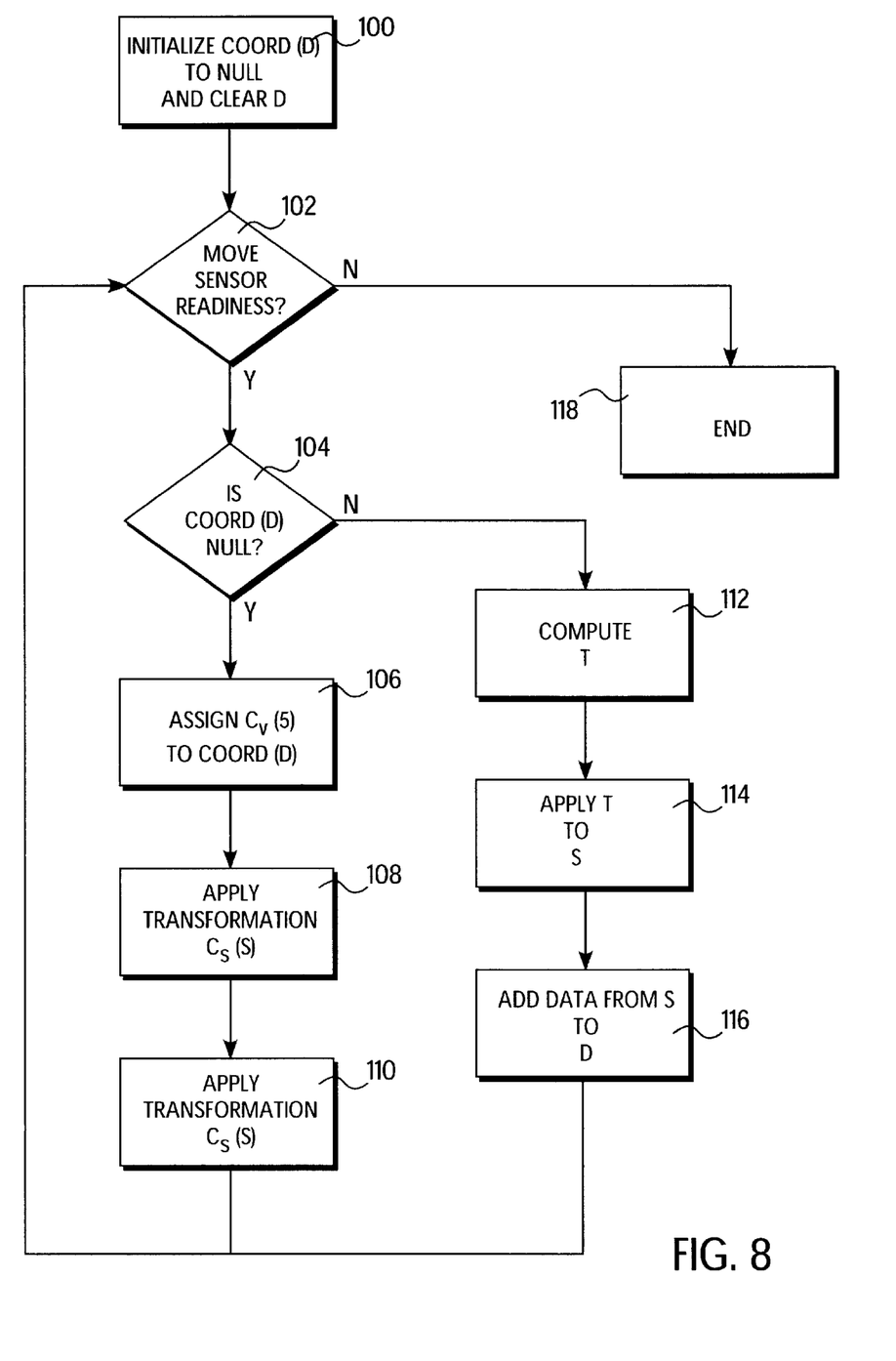
FIG. 8 is a flow chart representing the process by which data is mapped onto a coordinate system representing the density map with respect to the changing position of a mobile autonomous vehicle.

First, in box 100, the density map D is cleared and Coord(D) set to NULL. Box 102 is a loop control which will loop through all sensors. For each sensor reading S, determine, in box 104, if Coord(D) is NULL. If Coord(D) is NULL, assign Cv(S) to Coord(D)(106), apply transformation Cs(S)(108) and add the data from S into D (110). If Coord(D) is not NULL, then compute T, the transformation from Cv(S) to Coord(D) compounded with Cs(S)(112). Apply T to S to convert S into the density map coordinate system (114), and add the data from the transformed S into D (116).

Every few seconds, the data from the density map is cleared and Coord(D) is set to Null again. This starts a new density map whose coordinate system will be collocated with the position of the first sensor reading attached. As the vehicle moves along, the coordinate system of the density map will therefore jump every few seconds to track the motion of the vehicle.

This approach avoids any smearing of the data from vehicle motion, while simultaneously avoiding the complexities of scrolling maps or data timeout.

Once we have obtained a density vector, it can be used to classify terrain for purposes of vehicle navigation and traversability. The terrain classification is simply a mapping from the density vector into a classification that is meaningful to the end user—either a human operator or an automated path planner. Using the exemplary sensors discussed previously, i.e., the laser rangefinders and the radar, several inferences regarding possible characteristics of the terrain can be drawn. For example, if both the radar and the laser rangefinders have a low permeability in a certain cell or group of cells, it is likely that a solid object is present in that area, such as a tree, rock or wall. A high radar permeability and a low laser rangefinder permeability may indicate tall, dense grass, while a low radar permeability and a high laser rangefinder permeability may indicate sparse, wet grass. A high permeability from both the laser rangefinder and the radar is likely open space. In between, of course are infinite possibilities regarding permeability for both sensors, and a terrain classification system will be able to interpret the data in a manner which results in the most accurate classification of the terrain, based on the type of sensors used and the specific data received from each sensor.

The exact parameters that determine the end classification for purposes of this disclosure were selected manually, but it is also possible that machine learning techniques and neural networks could be used to automate this mapping. It is important to note that we are not attempting to combine data from all the sensors into a single real-number representation of traversability, as might be accomplished with a traditional prior art occupancy grids, because such a single-valued representation is not sufficient for outdoor terrain classification. Instead, this invention sets forth an improvement to the prior art occupancy indicator by providing the density vector for use as an input to one of a number of possible types of terrain classification systems. A vector representation of density that can express that a cell is highly permeable to radar but not at all permeable to a laser rangefinder provides a much better basis for classification than a scalar metric that expresses medium permeability averaged over all sensors.

While the current invention has been-described with respect to a specific implementation using specific sensors, the invention is not meant to be limited thereby. Instead, any combination of sensors of any different type may be used, and such implementations will still be within the intended scope of the invention as long as the interpreted data is used as a representation of the density of the surrounding terrain. Likewise, no specific vehicles have been presumed, nor is any specific vehicle meant to be a part of the invention. Furthermore, this invention is not meant to be limited to applications involving robots or otherwise mobile vehicles.

I claim:

1. A method of constructing a density map for local terrain comprising the steps of dividing said local terrain into a grid of cells;

obtaining readings for at least a portion of said cells from one or more environmental sensors; and providing a vector for each of said cells in said grid for which readings are available, said vector representing the density of the terrain represented by each of said cells.

2. The method of claim 1 wherein said reading from said sensors are readings of the permeability of terrain corresponding to each of said cells to energy emitted from said one or more sensors.

3. The method of claim 1 further comprising the steps of:

determining, from said readings from said one or more sensors, the minimum elevation for those cells for which a reading is available; and storing said minimum elevation data with said density vector for each of said cells.

4. The method of claim 3 further comprising the steps of:

determining, from said readings from said one or more sensors, the maximum elevation for those cells for which a reading is available; and storing said maximum elevation data with said density vector for each of said cells.

5. The method of claim 1 wherein a new density map is re-generated at periodic intervals.

6. The method of claim 5 wherein said density map is cleared prior the generation of a new map.

7. The method of claim 5 wherein a portion of said density map is discarded and a portion is retained, and further wherein said retained portion is used to establish a new density map.

8. The method of claim 7 wherein said portion of said density map which is discarded contains the oldest of said readings and said portion of said density map which is retained contains the latest of said readings.

9. The method of claim 2 wherein said step of obtaining permeability readings further comprises the steps of:

directing said one or more sensors to emit energy at specific wavelengths directed in a specific direction;

measuring the degree of said energy reflected back to said sensors and the time elapsed between the emission of said energy and the detection of said reflected energy; and determining the percentage of said emitted energy which is reflected back from said local terrain corresponding to one or more of said grid cells located at varying distances from said sensors.

10. The method of claim 1 wherein said one or more sensors are located on a mobile platform and further comprising the step of:

normalizing said readings received from said one or more sensors to compensate for motion of said mobile platform.

11. The method of claim 10 wherein each of said grid cells is assigned grid coordinates and wherein said step of normalizing said readings further comprises the steps of:

establishing a base reference for said grid coordinates based on the actual or estimated position of said mobile platform;

for each of said readings from said one or more sensors, adjusting the position of said reading to compensate for actual or estimated movement of said mobile platform since the establishment of said base reference.

12. The method of claim 11 further comprising the step of periodically re-establishing said base reference based on the actual or estimated position of said mobile platform.

13. The method of claim 12 further comprising the step of clearing said density map of all data prior to said establishment of a new base reference.

14. The method of claim 12 further comprising the step of re-normalizing any readings retained in said density map to said new base reference.

15. The method of claim 1 further comprising the step of providing a classification of said local terrain for each of said cells based on an interpretation of all data associated with each of said cells.

16. The method of claim 15 wherein said classification provides an indication of whether or not a mobile vehicle could traverse an area of said local terrain associated with any one of said cells.

17. An apparatus for assisting the autonomous navigation of a mobile vehicle comprising:

one or more environmental sensors mounted on said vehicle;

a processor programmed to receive data readings from said one or more sensors; and software for constructing a density map based on said readings;

wherein said density map contains cells representing physical areas surrounding said vehicle and further wherein each of said cells contains at least a minimum terrain elevation and a density vector.

18. The apparatus of claim 17 wherein each of said cells also contains a data element representing the maximum terrain elevation.

19. The apparatus of claim 17 wherein said density vector for each of said cells represents an indication of the permeability of the portion of said physical areas surrounding said vehicle associated with each of said cells to energy emitted from each of said one or more sensors.

20. The apparatus of claim 17 wherein said software is capable of adjusting said readings from said one or more sensors to account for movement of said vehicle as said readings are taken.

21. The apparatus of claim 17 wherein said software periodically shifts said readings in said density map to account for movement of said vehicle.

22. The apparatus of claim 17 further comprising:

software capable of interpreting said density map to establish a classification of said physical areas surrounding said vehicle corresponding to each of said cells.

23. The apparatus of claim 22 wherein said classification of said physical areas surrounding said vehicle is used to determine if said mobile vehicle can traverse said terrain.

* * * * *